United States Patent [19]

Cherukuri et al.

[11] Patent Number: 5,013,716
[45] Date of Patent: May 7, 1991

[54] UNPLEASANT TASTE MASKING COMPOSITIONS AND METHODS FOR PREPARING SAME

[75] Inventors: Subraman R. Cherukuri, Towaco, N.J.; Lucy L. Wong, Jackson Heights, N.Y.; Steven M. Faust, Stanhope, N.J.

[73] Assignee: Warner-Lambert Company, Morris Plains, N.J.

[21] Appl. No.: 264,281

[22] Filed: Oct. 28, 1988

[51] Int. Cl.$^5$ .................. A61K 31/70; A61K 31/715
[52] U.S. Cl. ....................................... 514/23; 514/53; 514/54; 514/819; 514/824; 514/825; 514/853; 514/855; 514/867; 424/48; 424/439; 424/440; 424/441; 426/548; 426/648; 426/650; 426/651; 426/656
[58] Field of Search ............... 426/548, 648, 650, 651, 426/656, 658, 660; 424/439, 440, 441, 48; 514/2, 53, 54; 536/18.4, 4.1; 530/801; 524/819, 824, 225, 853, 855, 867

[56] References Cited

U.S. PATENT DOCUMENTS

| | | |
|---|---|---|
| 4,158,068 | 6/1979 | Von Rymon Lipinski et al. .................................. 426/548 |
| 4,361,580 | 10/1982 | Peck et al. .................... 424/287 |
| 4,389,394 | 6/1983 | Drucker ......................... 424/53 |
| 4,495,170 | 1/1985 | Beyts et al. ................... 424/48 |
| 4,497,832 | 2/1985 | Cherukuri et al. .............. 426/5 |
| 4,536,396 | 8/1985 | Stephens, Jr. et al. ........ 514/2 |
| 4,565,702 | 1/1986 | Morley et al. .................. 426/93 |
| 4,597,970 | 7/1986 | Sharma et al. ............. 426/658 X |
| 4,639,367 | 1/1987 | Mackles ...................... 514/945 X |
| 4,643,892 | 2/1987 | Peters et al. .................. 424/15 |
| 4,753,806 | 6/1988 | Carroll et al. .............. 426/804 X |
| 4,761,274 | 8/1988 | Denick et al. .................. 424/48 |
| 4,803,082 | 2/1989 | Cherukuri et al. ............ 424/48 X |
| 4,824,681 | 4/1989 | Schobel et al. ............... 424/48 X |

FOREIGN PATENT DOCUMENTS 2154850A 2/1985 United Kingdom .

OTHER PUBLICATIONS

*Hawley's Condensed Chemical Dictionary*, p. 527, 11th ed. Van Nostrand Reinhold Company (1987).
H. A. Lieberman and L. Lachman, *Pharmaceutical Dosage Form: Tablets, vol. 1, pp. 339 to 469*, Marcel Dekker Inc. (1980).
Mazur et al, "Structure-Taste Relationships of Some Dipeptides", *J. Am. Chem. Soc.*, 91:10, pp. 2684–2691 (1969).
B. W. Minifie, *Chocolate, Cocoa and Confectionary: Science and Technology*, pp. 424–425, AVI Publishing Company, Inc., 2nd ed. (1986).
O'Brien Nabors and Gelardi, *Alternative Sweeteners*, p. 3, Marcel Dekker, Inc. (1986).

*Primary Examiner*—John W. Rollins
*Attorney, Agent, or Firm*—Craig M. Bell

[57] ABSTRACT

The present invention pertains to an unpleasant taste masking composition which comprises a flavoring agent having a bitter taste or unpleasant off-note and a sufficient amount of a non-bitter intense sweetener to nullify the taste or off-note of the flavoring agent. The unpleasant taste masking composition may be used in ingestible products such as hard and soft confections, chewing gum compositions and the like. The present invention also pertains to a method for preparing the unpleasant taste masking compositions and the ingestible products in which they may be used.

31 Claims, No Drawings

UNPLEASANT TASTE MASKING COMPOSITIONS AND METHODS FOR PREPARING SAME

BACKGROUND OF THE INVENTION

1. Field of the Invention

This invention relates to unpleasant taste masking compositions prepared by combination of a non-bitter intense sweetening agent and a flavoring agent having a bitter taste or unpleasant off-note. More particularly, this invention relates to an unpleasant taste masking effect found between the combination of a non-bitter intense sweetening agent such as derivatives of chlorodeoxysugars or dipeptide based sweeteners and a flavoring agent having a bitter taste or unpleasant off-note. The unpleasant taste masking composition may be utilized in a wide variety of ingestible compositions. This invention also relates to methods by which these unpleasant taste masking compositions may be prepared.

2. Description of the Prior Art

"Flavor" is defined as "the simultaneous physiological and psychological response obtained from a substance in the mouth that includes the senses of taste (salty, sour, bitter, sweet), smell (fruity, pungent), and feel ... [which may be defined as] the effect of chemical action on the mouth membranes such as heat from pepper, coolness from peppermint and the like." Hawley's Condensed Chemical Dictionary, p. 527, 11th Edition (1987). Hence, the perception of flavor involves the interrelationship of many elements. This interrelationship of elements may vary from individual to individual and hence may result in individual perceptions of flavor. The term "flavor", or flavoring agents, is also used to categorize substances which contribute to the taste of an ingestible product. The term "sweetening agent" is used to identify a natural or synthetic food additive which provides sweetness to a food or beverage and which is perceived by the sense of taste. Although the individual perception of flavoring agents and sweetening agents depends on the interrelation of many elements, flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral interaction between a flavoring agent and a sweetening agent also involves the interrelationship of many elements which may vary from individual to individual and may be a unique sensory sensation.

Intense sweetening agents are natural or synthetic compounds which have a sweetening intensity greater than that of sugar (sucrose) and which oftentimes have a lower caloric value than that of sugar. Because the intense sweeteners provide greater sweetening capacity than sugar, smaller amounts of the sweeteners will provide sweetening intensity equivalent to larger amounts of sugar. Intense sweeteners are well known in the art and are widely used in place of sugar in many low calorie and/or noncariogenic compositions. Intense sweeteners which are not non-caloric, that is, have a caloric value, can provide compositions which have decreased caloric value, as compared to sugarsweetened compositions, because far lower amounts of the intense sweetener are required to achieve optimum sweetness in the composition.

Intense sweeteners have a wide range of chemically distinct structures and, hence, possess varying properties. These intense sweetener compounds include proteins such as thaumatin (Talin, a commercially available product of Tate & Lyle Products, Reading, United Kingdom), dipeptides such as N-L-alpha-aspartyl-L-phenylalanine 1-methyl ester (Aspartame, a commercially available product of the Nutrasweet Company, Deerfield, Ill.) and dihydrochalcones. Each of these compounds has a distinct sweetening intensity as compared to sucrose and this sweetening intensity is well documented. For example, the following compounds have these different sweetening intensities:

| Compound | Intensity (compared to sucrose) |
| --- | --- |
| Soluble saccharin salts | 300× |
| Cyclamate salts | 30× |
| N-L-alpha-Aspartyl-L-phenylalanine 1-methyl ester (Aspartame) | 180× |
| Potassium salt of 6-methyl-1,2,3-oxathiazin-4(3H)-one-2,2-dioxide (Acesulfame-K, a commercially available product of Hoechst Celanese Corporation, Somerville, New Jersey) | 200× |
| 4,1',6'-Trichloro-4,1',6'-trideoxy-galactosucrose (Sucralose, a commercially available product of McNeil Specialty Products Company, Skillman New Jersey) | 600× |
| L-alpha-Aspartyl-N-(2,2,4,4-tetramethyl-3-thietanyl)-D-alaninamide hydrate (Alitame, a commercially available product of Pfizer, New York, New York) | 2000× |

Because each intense sweetener is chemically distinct, each sweetener presents a different challenge with respect to the actual use of such sweetener in ingestible compositions. For example, some intense sweeteners present stability problems, such as Aspartame, which exhibits instability in the presence of aldehydes, ketones, moisture and the like. Other intense sweeteners have an associated bitter taste or off-note, such as Saccharin (a commercially available product of PMC Specialty Group Inc., Cinncinnati, Ohio), stevioside, Acesulfame-K, glycyrrhizin, dipotassium glycyrrhizin, glycyrrhizic acid ammonium salt, and thaumatin (Talin).

Certain intense sweeteners have been used to offset the associated bitter aftertaste or unpleasant offnote of other intense sweeteners. For example, United Kingdom patent application no. 2154850A, assigned to Tate & Lyle plc, discloses the use of a combination of at least two intense sweeteners to modify the associated unpleasant taste of one of the sweeteners (cyclamate). The combination of the two sweeteners is said to provide a preferred sweetness. Specifically, a composition is disclosed for sweetening a beverage such as a cola, tea or coffee which comprises combining a chlorosucrose sweetener with a cyclamate, which is either alone or is in combination with other sweeteners.

U.S. Pat. No. 4,495,170, issued to Beytes et al. and assigned to Tate and Lyle plc, discloses synergistic sweetening compositions which comprise a mixture of a chlorodeoxysugar and another sweetening agent which has an associated bitter taste. The chlorodeoxysugars are selected from the group consisting of chlorodeoxysucroses and chlorodeoxygalactosucroses. The bitter tasting sweetening agent is selected from the group consisting of Saccharin, stevioside and Acesulfame-K.

U.S. Pat. No. 4,535,396, issued to Stephens, Jr. et al. and assigned to Pfizer Inc., teaches a method of masking the bitter taste and enhancing the sweet taste of Acesulfame-K by combining the bitter-tasting intense sweetener with the sweetener Alitame.

U.S. Pat. No. 4,158,068, issued to Von Rymon Lipinski et al. and assigned to Hoechst (West Germany), discloses a sweetener mixture to improve the saccharose-like quality of acetosulfame-K. Specifically, acetosulfame-K is combined with at least one intense sweetener selected from the group consisting of aspartyl peptide ester sweeteners, sulfamate sweeteners, sulfimide sweeteners and dihydrochalcone sweeteners.

Thus, a variety of combinations of intense sweeteners are known which provide compositions which have a reduced associated bitter taste or other unpleasant off-note. However, intense sweeteners which have an associated bitter taste or unpleasant off-note are known to increase the unpleasant taste of compositions containing certain flavors. Accordingly, there is a need for bitterness or off-note masking compositions which mask ingestible compositions which contain flavoring agents having a bitter taste or unpleasant off-note. Such unpleasant taste masking compositions would provide an improved taste for a prolonged period of time for ingestible compositions which contain flavors having a bitter taste or unpleasant off-note, would allow for a reduced total amount of sweetening composition, would thereby reduce costs, stability problems, cariogenic properties, and the like. The present invention provides such unpleasant taste masking compositions and various ingestible compositions which incorporate such unpleasant taste masking compositions.

SUMMARY OF THE INVENTION

The present invention pertains to an unpleasant taste masking composition which comprises a flavoring agent having a bitter taste or unpleasant off-note and a sufficient amount of a non-bitter intense sweetener to nullify the bitter taste or unpleasant off-note of the flavoring agent. The unpleasant taste masking composition may be used in ingestible products such as hard and soft confections, chewing gum compositions and the like. The present invention also pertains to methods for preparing the unpleasant taste masking compositions and the ingestible products in which they may be used.

DETAILED DESCRIPTION OF THE INVENTION

The present invention pertains to compositions which contain certain non-bitter intense sweeteners which mask the bitterness or off-note of certain flavors. In particular, the present invention pertains to a combination of a flavoring agent having a bitter taste or unpleasant off-note and a sufficient amount of a non-bitter intense sweetening agent such as a chlorodeoxysugar derivative or a dipeptide based sweetener to nullify the bitter taste or unpleasant off-note of the flavoring agent. The present invention provides unpleasant taste masking compositions which have an improved taste without a bitter or off-note for a prolonged period of time, as well as ingestible products which contain the unpleasant taste masking compositions.

By the term "ingestible", applicants include all materials and compositions which are used by, or which perform a function in, the body. Thus, materials and compositions which are not adsorbed or absorbed are included as well as digestible and non-digestible materials and compositions.

In a preferred embodiment, the unpleasant taste masking compositions comprise in percentages by weight (1) a flavoring agent having a bitter taste or unpleasant off-note in an amount from about 0.0001% to about 5.0%, and (2) an intense sweetening agent present in an amount from about 0.001% to about 5.0%. In a more preferred embodiment, the unpleasant taste masking compositions comprise in percentages by weight (1) a flavoring agent having a bitter taste or unpleasant off-note in an amount from about 1.0% to about 3.0%, and (2) an intense sweetening agent present in an amount from about 0.02% to about 1.0%. In a most preferred embodiment, the unpleasant taste masking compositions comprise in percentages by weight (1) a flavoring agent having a bitter taste or unpleasant off-note in an amount from about 1.2% to about 2.5%, and (2) an intense sweetening agent present in an amount from about 0.05% to about 0.5%.

The non-bitter intense sweetening agents (sweeteners) of the present invention may be chlorodeoxysugar derivatives or dipeptide based sweeteners. The chlorodeoxysugar derivatives may be derivatrves of chlorodeoxysucrose or chlorodeoxygalactosucrose. Examples of chlorodeoxysucrose and chlorodeoxygalactosucrose derivatives include but are not limited to:

(a) 1-chloro-1'-deoxysucrose;
(b) 4-chloro-4-deoxy-alpha-D-galactopyranosyl-alpha-D-fructofuranoside, or 4-chloro-4-deoxygalactosucrose;
(c) 4-chloro-4-deoxy-alpha-D-galactopyranosyl-1-chloro-1-deoxy-beta-D-fructofuranoside, or 4,1'-dichloro-4,1'-dideoxygalactosucrose;
(d) 1',6'-dichloro-1',6'-dideoxysucrose;
(e) 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose;
(f) 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose;
(g) 6,1',6'-trichloro-6,1',6'-trideoxysucrose;
(h) 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalactosucrose; and
(i) 4,6,1',6'-tetrachloro-4,6,1',6'-tetradeoxysucrose.

In a preferred embodiment, the chlorodeoxysugar derivative is 4-chloro-4-deoxy-alpha-D-galactopyranosyl-1,6-dichloro-1,6-dideoxy-beta-D-fructofuranoside, which is also known as 4,1',6'-trichloro-4,1',6'-trideoxygalactosucrose (Sucralose).

The non-bitter intense sweeteners of the present invention may also be dipeptide based sweeteners. Examples of dipeptide based sweeteners which may be used include but are not limited to:

(a) N-L-alpha-aspartyl-L-phenylalanine 1-methyl ester (Aspartame);
(b) L-alpha-aspartyl-N-(2,2,4,4-tetramethyl-3-thietanyl)-D-alaninamide hydrate (Alitame);
(c) methyl esters of L-aspartyl-L-phenylglycerine;
(d) methyl esters of L-aspartyl-L-2,5-dihydrophenylglycine;
(e) L-aspartyl-2,5-dihydro-L-phenylalanine; and
(f) L-aspartyl-L-(1-cyclohexen)-alanine.

See also, Mazur et al., *J. Amer. Chem. Soc.*, 91, 10 (1969), *Structure-Taste Relationships of Some Dipeptides*.

In a preferred embodiment, the dipeptide based sweetener is N-L-alpha-aspartyl-L-phenylalanine 1-methyl ester (Aspartame). In an alternative preferred embodiment, the dipeptide based sweetener is L-alpha-aspartyl-N(2,2,4,4-tetramethyl-3-thietanyl)-D-alaninamide hydrate (Alitame).

The non-bitter intense sweetener of the present invention may be used in many distinct physical forms well known in the art to provide an initial burst of sweetness and flavor and/or a prolonged sensation of sweetness and flavor. Without being limited thereto, such physical forms include free forms, such as spray dried, powdered, and beaded forms, and encapsulated forms, and mixtures thereof.

The amount of non-bitter intense sweetening agent employed herein is that amount sufficient to nullify the bitter taste or unpleasant off-note of the flavoring agent having a bitter or unpleasant off-note. The amount of nonbitter intense sweetening agent employed is normally a matter of preference subject to such factors as the individual intense sweetener, the individual flavoring agent having a bitter or unpleasant off-note, the type of bulking agent or carrier employed, and the strength of sweetness and flavor desired. Thus the amount of sweetener may be varied in order to obtain the result desired in the final product and such variations are within the capabilities of those skilled in the art without the need for undue experimentation.

The flavoring agents (flavors, flavorings) of the present invention are flavors having an associated bitter taste or aftertaste or other unpleasant off-note which include those flavors known to the skilled artisan. These flavoring agents having a bitter or unpleasant off-note include natural, artificial and synthetic flavor oils and flavoring aromatics and/or oils, oleoresins and extracts derived from plants, leaves, flowers, fruits, and so forth, and combinations thereof. Nonlimiting representative flavor oils include spearmint oil, peppermint oil, eucalyptus oil, oil of nutmeg, allspice, mace, oil of bitter almonds, menthol and the like. Also useful flavorings are artificial, natural and synthetic fruit flavors such as citrus oils including lemon, orange, lime, grapefruit, and fruit essences including apricot and so forth. These flavoring agents may be used in liquid or solid form and may be used individually or in admixture.

Other useful flavorings include aldehydes and esters such as benzaldehyde (cherry, almond), citral, i.e., alpha-citral (lemon, lime), neral, i.e., beta-citral (lemon, lime), decanal (orange, lemon), aldehyde C-8 (citrus fruits), aldehyde C-9 (citrus fruits), aldehyde C-12 (citrus fruits), tolyl aldehyde (cherry, almond), 2,6-dimethyloctanal (green fruit), and 2-dodecenal (citrus, mandarin), mixtures thereof and the like.

In a preferred embodiment, the flavoring agent having a bitter or unpleasant off-note is spearmint oil.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agent of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent having a bitter or unpleasant off-note employed herein is normally a matter of preference subject to such factors as the individual flavor, the type of bulking agent or carrier employed, and the strength of flavor desired. Thus the amount of flavoring may be varied in order to obtain the result desired in the final product and such variations are within the capabilities of those skilled in the art without the need for undue experimentation.

In addition to the flavoring agents having a bitter or unpleasant off-note, set out above, the present invention also includes the combination of a medicament drug or a pharmaceutical which has a bitter taste or unpleasant off-note and a sufficient amount of a non-bitter intense sweetening agent to nullify the bitter taste or unpleasant off-note of the medicament.

The medicament drugs (medicaments, pharmaceuticals) of the present invention may be selected from a wide variety of drugs and their acid addition salts. Both organic and inorganic salts may be used provided the drug maintains its medicament value. Exemplary acid salts include hydrochloride, hydrobromide, orthophosphate, benzoate, maleate, tartrate, succinate, citrate, salicylate, sulfate and acetate.

The medicament drug may be selected from a wide range of unpleasant tasting therapeutic agents and mixtures of therapeutic agents. Nonlimiting illustrative categories and specific examples include:

(a) Analgesics, such as acetaminophen, ibuprofen, phenactetin and salicylamide;

(b) Antiasmatics, such as amino-phylline, metaproterenol, epinephrine and theophylline;

(c) Antitussives, such as dextromethorphan, dextromethorphan hydrobromide, noscapine, carbetapentane citrate and chlophedianol hydrochloride;

(d) Antihistamines, such as chlorpheniramine maleate, phenindamine tartrate, pyrilamine maleate, doxylamine succinate, phenyltoloxamine citrate, diphenylhydramine hydrochloride, promethazine and triprolidine;

(e) Antinauseants, such as dimenhydrinate and meclizine;

(f) Decongestants, such as phenylephrine hydrochloride, phenylpropanolamine hydrochloride, pseudoephedrine hydrochloride and ephedrine;

(g) Various alkaloids, such as codeine phosphate, codeine sulfate and morphine;

(h) Laxatives, such as phenolphthalein, danthron, pamabrom and bisocadyl;

(i) Anticholesterolemic and antilipid agents, such as gemfibrozil;

(j) Appetite suppressants, such as phenylpropanolamine hydrochloride and caffeine;

(k) Central nervous system stimulants, such as nicotine;

(l) Expectorants, such as guaifenesin;

(m) Anti-inflammatory agents, such as isoxicam, meclophenamic acid and naproxen; and (n) Nutritional supplements, including vitamins and minerals, such as niacin, pantothenic acid, vitamin B6, thiamine hydrochloride, riboflavin, potassium iodide, potassium chloride-, cupric sulfate and ferrous sulfate.

In a preferred embodiment the medicament is selected from the group consisting of dextromethorphan, dextromethorphan hydrobromide, pseudoephedrine, pseudoephedrine hydrochloride, guaifenesin and mixtures thereof.

The medicament of the present invention may be used in many distinct physical forms well known in the pharmaceutical art to provide an initial dosage of the medicament and/or a time-release form of the medicament. Without being limited thereto, such physical forms include free forms and encapsulated forms, and mixtures thereof.

The amount of medicament drug or its acid addition salt used in the present invention may vary depending upon the therapeutic dosage recommended or permitted. In general, the amount of medicament present is the ordinary dosage required to obtain the desired result. Such dosages are known to the skilled practitioner in the medical arts and is not a part of the present invention.

The unpleasant taste masking compositions of the present invention are prepared by admixing the flavoring agent which has a bitter or unpleasant off-note into the non-bitter intense sweetening agent.

The combination of the non-bitter intense sweeteners and the flavoring agent and/or medicament having a bitter taste or other unpleasant off-note, set out above, in the proportions disclosed, results in an unpleasant taste masking composition having a sweetening effect with no bitter or off-note. The unpleasant taste masking composition of the present invention is markedly greater than that of compositions which contain other intense sweeteners which have an associated bitter or off-note taste. Accordingly, applicants, unpleasant taste masking compositions have the advantage of providing an improved taste over a prolonged period of time.

Once prepared, the inventive unpleasant taste masking composition may be stored for future use or may be formulated with conventional additives, such as pharmaceutically acceptable carriers or confectionery ingredients to prepare a wide variety of ingestible compositions, such as foodstuffs, beverages, jellies, extracts, confectionery products, pharmaceutical compositions administered orally, and hygienic products such as a toothpastes, dental lotions, chewing gums or mouth washes.

The present invention extends to methods of making the ingestible compositions. In such a method, a composition is made by admixing the unpleasant taste masking composition of the present invention with the other ingredients of the final desired composition. Other ingredients will usually be incorporated into the composition as dictated by the nature of the desired composition as well known to those of ordinary skill in the art. The ultimate ingestible compositions are readily prepared using methods generally known in the food technology and pharmaceutical arts.

An important aspect of the present invention includes a chewing gum composition incorporating the inventive unpleasant taste masking composition and a method for preparing the chewing gum composition, including both chewing gum and bubble gum formulations. With regard to a chewing gum composition, such compositions contain a gum base, the inventive unpleasant taste masking composition, and various additives.

The gum base employed will vary greatly depending upon various factors such as the type of base desired, the consistency of gum desired and the other components used in the composition to make the final chewing gum product. The gum base may be any water-insoluble gum base known in the art, and includes those gum bases utilized for chewing gums and bubble gums. Illustrative examples of suitable polymers in gum bases include both natural and synthetic elastomers and rubbers. For example, those polymers which are suitable as gum bases include, without limitation, substances of vegetable origin such as chicle, crown gum, nispero, rosadinha, jelutong, perillo, niger gutta, tunu, balata, gutta-percha, lechi-capsi, sorva, gutta kay, mixtures thereof and the like. Synthetic elastomers such as butadiene-styrene copolymers, polyisobutylene, isobutyleneisoprene copolymers, polyethylene, mixtures thereof and the like are particularly useful.

The gum base may include a non-toxic vinyl polymer, such as polyvinyl acetate and its partial hydrolysate, polyvinyl alcohol, and mixtures thereof. When utilized, the molecular weight of the vinyl polymer may range from about 3,000 up to and including about 94,000.

The amount of gum base employed will vary greatly depending upon various factors such as the type of base used, the consistency of the gum desired and the other components used in the composition to make the final chewing gum product. In general, the gum base will be present in amounts from about 5% to about 94%, by weight of the final chewing gum composition, and preferably in amounts from about 15% to about 45%, and more preferably in amounts from about 15% to about 35%, and most preferably in amounts from about 20% to about 30%, by weiqht of the final chewing gum composition.

The gum base composition may contain conventional elastomer solvents to aid in softening the elastomer base component. Such elastomer solvents may comprise terpinene resins such as polymers of alpha-pinene or beta-pinene, methyl, glycerol or pentaerythritol esters of rosins or modified rosins and gums, such as hydrogenated, dimerized or polymerized rosins or mixtures thereof. Examples of elastomer solvents suitable for use herein include the pentaerythritol ester of partially hydrogenated wood or gum rosin, the pentaerythritol ester of wood or gum rosin, the glycerol ester of wood rosin, the glycerol ester of partially dimerized wood or gum rosin, the glycerol ester of polymerized wood or gum rosin, the glycerol ester of tall oil rosin, the glycerol ester of wood or gum rosin and the partially hydrogenated wood or gum rosin and the partially hydrogenated methyl ester of wood or rosin, mixtures thereof, and the like. The elastomer solvent may be employed in amounts from about 5.0% to about 75.0%, by weight of the gum base, and preferably from about 45.0% to about 70.0%, by weight of the gum base.

A variety of traditional ingredients may be included in the gum base in effective amounts such as plasticizers or softeners such as lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, mixtures thereof, and the like may also be incorporated into the gum base to obtain a variety of desirable textures and consistency properties. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like may also be incorporated into the gum base to obtain a variety of desirable textures and consistency properties. These traditional additional materials are generally employed in amounts up to about 30.0%, by weight of the gum base, and preferably in amounts from about 3% to about 20%, by weight of the gum base.

The gum base may include effective amounts of mineral adjuvants such as calcium carbonate, magnesium carbonate, alumina, aluminum hydroxide, aluminum silicate, talc, tricalcium phosphate, dicalcium phosphate and the like as well as mixtures thereof. These mineral adjuvants may serve as fillers and textural agents. These fillers or adjuvants may be used in the gum base in various amounts. Preferably the amount of filler when used will be present in an amount from greater than about 0% to about 60%, by weight of the chewing gum base.

The chewing gum base may additionally include the conventional additives of coloring agents, antioxidants, preservatives and the like. For example, titanium dioxide and other dyes suitable for food, drug and cosmetic applications, known as F.D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the chewing gum base.

The gum composition may include effective amounts of conventional additives selected from the group consisting of sweetening agents (sweeteners), plasticizers, softeners, emulsifiers, waxes, fillers, bulking agents, mineral adjuvants, flavoring agents (flavors, flavorings), coloring agents (colorants, colorings), antioxidants, acidulants, thickeners, mixtures thereof and the like. Some of these additives may serve more than one purpose. For example, in sugarless gum compositions, the sweetener, e.g., sorbitol or other sugar alcohol or mixtures thereof, may also function as a bulking agent. Similarly, in sugar containing gum compositions, the sugar sweetener can also function as a bulking agent.

The plasticizers, softeners, mineral adjuvants, colorants, waxes and antioxidants discussed above as being suitable for use in the gum base may also be used in the gum composition. Examples of other conventional additives which may be used include emulsifiers, such as lecithin and glyceryl monostearate, thickeners, used alone or in combination with other softeners, such as methyl cellulose, alginates, carrrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants. The fillers when used may be utilized in an amount from greater than about 0% to about 60%, by weight of the gum composition.

Bulking agents (carriers, extenders) suitable for use include sweetening agents selected from the group consisting of monosaccharides, disaccharides, polysaccharides, sugar alcohols, and mixtures thereof; polydextrose; maltodextrins; minerals, such as calcium carbonate, talc, titanium dioxide, dicalcium phosphate, and the like. Bulking agents may be used in amounts up to about 90%, by weight of the final gum composition, with amounts from about 40% to about 70%, by weight of the gum composition being preferred, with from about 50% to about 65%, by weight, being more preferred and from about 55% to about 60%, by weight of the chewing gum composition, being most preferred.

The sweetening agent used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as monosaccharides, disaccharides and polysaccharides such as xylose, ribulose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, glycyrrhizin, and sugar alcohols such as sorbitol, mannitol, maltitol, hydrogenated starch hydrolysates and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and the like;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine; L-aspartyl-L-(1-cyclohexen)-alanine, and the like;

(d) water-soluble sweeteners derived from naturally occurring water-soluble sweeteners, such as chlorinated derivatives of ordinary sugar (sucrose), known, for example, under the product designation of Sucralose; and (e) protein based sweeteners such as thaumaoccous danielli (Thaumatin I and II).

In general, an effective amount of sweetener is utilized to provide the level of bulk and/or sweetness desired, and this amount will vary with the sweetener selected. This amount of sweetener will normally be present in amounts from about 0.0025% to about 90%, by weight of the gum composition, depending upon the sweetener used. The exact range of amounts for each type of sweetener is well known in the art and is not the subject of the present invention. The amount of sweetener ordinarily necessary to achieve the desired level of sweetness is independent from the flavor level achieved from flavor oils.

Preferred sugar based-sweeteners are sugar (sucrose), corn syrup and mixtures thereof. Preferred sugarless sweeteners are the sugar alcohols, artificial sweeteners, dipeptide based sweeteners and mixtures thereof. Preferably, sugar alcohols are used in the sugarless compositions because these sweeteners can be used in amounts which are sufficient to provide bulk as well as the desired level of sweetness. Preferred sugar alcohols are selected from the group consisting of sorbitol, xylitol, maltitol, mannitol, and mixtures thereof. More preferably, sorbitol or a mixture of sorbitol and mannitol is utilized. The gamma form of sorbitol is preferred. An artificial sweetener or dipeptide based sweetener is preferably added to the gum compositions which contain sugar alcohols.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the KirkOthmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7.0%, by weight, and preferably up to about 3.5%, by weight of the gum composition.

In accordance with this invention, effective amounts of the unpleasant taste masking compositions of the present invention may be admixed into the chewing gum composition. The amount of unpleasant taste masking composition employed is normally a matter of preference subject to such factors as the individual flavor having a bitter or unpleasant off-note, the type of bulking agent or carrier employed, the type of non-bitter intense sweetener used and the strength of flavor desired. In addition, in the case of a medicated chewing gum product containing a medicament, the amount of unpleasant taste masking composition employed is subject to such additional factors as the degree of bitter or off-note taste of the medicament and the therapeutically effective dosage level of the medicament. Thus, the amount of unpleasant taste masking composition may be varied in order to obtain the result desired in the final product and such variations are within the capabilities of those skilled in the art without the need for undue experimentation.

In a preferred embodiment, the unpleasant taste masking compositions comprise in percentages by weight (1) a flavoring agent having a bitter taste or unpleasant off-note in an amount from about 0.0001% to about 5.0%, and (2) an intense sweetening agent present in an amount from about 0.001% to about 5.0%. In a more preferred embodiment, the unpleasant taste masking compositions comprise in percentages by weight (1) a flavoring agent having a bitter taste or unpleasant off-note in an amount from about 1.0% to about 3.0%, and (2) an intense sweetening agent present in an amount from about 0.02% to about 1.0%. In a most preferred embodiment, the unpleasant taste masking compositions comprise in percentages by weight (1) a flavoring agent having a bitter taste or unpleasant off-note in an amount from about 1.2% to about 2.5%, and (2) an intense sweetening agent present in an amount from about 0.05% to about 0.5%.

In addition to the inventive unpleasant taste masking compositions containing a flavoring agent having a bitter or other unpleasant off-note, secondary flavoring agents may also be used in the chewing gum formulations of this invention. Such additional flavors should be compatible with the unpleasant taste masking composition and not adversely alter the sensory perception of the unpleasant taste masking composition.

The secondary flavoring agents useful to prepare the flavoring compositions of this invention include those flavorings known to the skilled artisan such as flavorings derived from plants, leaves, flowers, fruits, and the like, and mixtures thereof. Representative flavor oils include cinnamon oil and oil of wintergreen (methyl salicylate). Also useful flavorants are artificial, natural and synthetic fruit flavors such as citrus oils, including lemon, lime, orange, grape, and grapefruit, and fruit essences including apple, strawberry, cherry, pineapple and the like, and mixtures thereof.

The secondary flavoring agent may be employed in either liquid form and/or dried form. When employed in the latter form, suitable drying means such as spray drying the oil may be used. Alternatively, the secondary flavoring agent may be absorbed onto water soluble materials, such as cellulose, starch, sugar, maltodextrin, gum arabic and so forth. The actual techniques for preparing such dried forms are well known and do not constitute a part of this invention.

The secondary flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of secondary flavoring agent employed in the chewing gum composition of this invention is normally a matter of preference. In general, the secondary flavoring agent is present in amounts from about 0.02% to about 5%, by weight of the gum composition. Preferably, the secondary flavoring agent is present in amounts from about 0.1% to about 2%, by weight, and more preferably, the secondary flavoring agent is present in amounts from about 0.3% to about 1.5%, by weight of the chewing gum composition.

The unpleasant taste masking compositions may be incorporated into an otherwise conventional chewing gum composition using standard techniques and equipment known to those skilled in the art. For example, a gum base is heated to a temperature sufficiently high enough to soften the base without adversely effecting the physical and chemical make up of the base. The optimum temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the base such as the plasticizer, fillers, the bulking agent and/or sweeteners, the softener and coloring agents to plasticize the blend as well as to modulate the hardness, viscoelasticity and formability of the base. The chewing gum base is then blended with the flavoring agents having a bitter taste or unpleasant off-note and intense sweeteners of the unpleasant taste masking composition which may have been previously blended with other traditional ingredients. Mixing is continued until a uniform mixture of gum composition is obtained. Thereafter the gum composition mixture may be formed into desirable chewing gum shapes.

The preparation of confectionery formulations is historically well known and has changed little through the years. Confectionery items have been classified as either "hard" confectionery or "soft" confectionery. The unpleasant taste masking compositions of the present invention can be incorporated by admixing the inventive composition into conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweeteners, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° to 156° C. is achieved. The batch is then cooled and worked as a plastic-like mass to incorporate additives such as flavors, colorants and the like.

A high-speed atmospheric cooker uses a heatexchanger surface which involves spreading a film of candy on a heat exchange surface, the candy is heated to 165° to 170° C. in a few minutes. The candy is then rapidly cooled to 100° to 120° C. and worked as a plastic-like mass enabling incorporation of the additives, such as flavors, colorants and the like.

In vacuum cookers, the carbohydrate bulking agent is boiled to 125° to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets*, Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavors, colorants and so forth.

Similar to hard confectionery, soft confectionery may be utilized in this invention. The preparation of soft confections, such as nougat, involves conventional methods, such as the combination of two primary components, namely (1) a high boiling syrup such as a corn syrup, hydrogenated starch hydrolysate or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a hydrogenated starch hydrolysate. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology*, 2nd edition, AVI Publishing Co., Inc., Westport, Conn. (1980), at pages 424-425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80o C , at which point, the flavor may be added. The mixture is further mixed for an additional period until it is ready to be removed and formed into suitable confectionery shapes.

In accordance with this invention, effective amounts of the unpleasant taste masking compositions of the present invention may be admixed into the hard and soft confections. The amount of unpleasant taste masking composition employed is normally a matter of preference subject to such factors as the individual flavor having a bitter or unpleasant off-note, the type of bulking agent or carrier employed, and the type of non-bitter intense sweetener used. In addition, in the case of a medicated confectionery product containing a medicament, the amount of unpleasant taste masking composition employed is subject to such additional factors as the degree of bitter taste or unpleasant off-note of the medicament and the therapeutically effective dosage level of the medicament. Thus the amount of unpleasant taste masking composition may be varied in order to obtain the result desired in the final product and such variations are within the capabilities of those skilled in the art without the need for undue experimentation.

The unpleasant taste masking compositions may be incorporated into an otherwise conventional hard or soft confection composition using standard techniques and equipment known to those skilled in the art.

Also in accordance with this invention, effective amounts of the unpleasant taste masking compositions containing medicaments may be admixed into pharmaceutical ingestible compositions. The amount of unpleasant taste masking composition employed is subject to such factors as the therapeutically effective dosage level of the medicament and the degree of bitter taste or unpleasant off-note of the medicament. Thus the amount of unpleasant taste masking composition may be varied in order to obtain the result desired in the final product and such variations are within the capabilities of those skilled in the art without the need for undue experimentation.

The pharmaceutical ingestible compositions of the invention may be prepared by conventional methods long established in the art of pharmaceutical compounding. The compositions may contain conventional adjuvant materials employed in formulating the compositions of the art. The pharmaceutically acceptable carriers may be selected from a wide range of materials. Without being limited thereto, such materials include diluents, binders and adhesives, lubricants, disintegrants, colorants, flavorings, sweeteners, and miscellaneous materials such as buffers and adsorbents in order to prepare a particular composition.

The unpleasant taste masking compositions may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

The present invention is further illustrated by the following examples which are not intended to limit the effective scope of the claims. All parts and percentages in the examples and throughout the specification and claims are by weight of the final composition unless otherwise specified.

EXAMPLES 1-8

These examples demonstrate unpleasant taste masking ability for various intense sweeteners in chewing gum products containing spearmint oil as the flavoring agent.

| Ingredient (Percent by Weight) | EXAMPLES 1-8 | | | | | | | |
|---|---|---|---|---|---|---|---|---|
| | 1 | 2 | 3 | 4 | 5 | 6 | 7 | 8 |
| gum base | 23.0 | 23.0 | 23.0 | 23.0 | 23.0 | 23.0 | 23.0 | 23.0 |
| bulking agent | 60.01 | 59.95 | 59.935 | 59.9 | 59.8 | 59.66 | 59.87 | 59.76 |
| softener | 15.5 | 15.5 | 15.5 | 15.5 | 15.5 | 15.5 | 15.5 | 15.5 |
| colorant | 0.17 | 0.17 | 0.17 | 0.17 | 0.17 | 0.17 | 0.17 | 0.17 |
| spearmint | 1.32 | 1.32 | 1.32 | 1.32 | 1.32 | 1.32 | 1.32 | 1.32 |
| Sucralose (ppm) | — | 525 | 750 | 1000 | | | | |
| Aspartame (ppm) | — | | | | 2000 | 3500 | | |
| Saccharin (ppm) | — | | | | | | 1400 | |
| Acesulfame-K (ppm) | — | | | | | | | 2500 |

An expert sensory chew panel evaluated the chewing gum products of examples 1-8. Example 1 illustrates a conventional gum product containing spearmint oil as the flavoring agent with no non-bitter intense sweetener present.

The chewing gum products of examples 7 and 8, which contained Saccharin and Acesulfame-K as the intense sweetening agents, respectively, did not exhibit a decrease in bitter sensation or other off-note compared to the chewing gum product of example 1 which contained no intense sweetener. The chewing gum products of examples 2 and 3, which contained small amounts of Sucralose, and the chewing gum products of examples 5 and 6, which contained Aspartame, exhibited an unpleasant taste profile having a 50% reduction in bitterness/off-note sensation compared to the chewing gum product of example 1. The chewing gum product of example 4, which contained twice the amount of Sucralose sweetener as the product of example 2, showed a surprisingly much greater reduction in bitterness/off-note sensation than the chewing gum products of examples 2, 3, 5 and 6.

The chewing gum product of example 4 was significantly more preferred than the other chewing gum products of examples 1-8 because the product of example 4 had a pleasant and prolonged spearmint flavor without any bitter aftertaste or other unpleasant off-note.

EXAMPLES 9-14

These examples demonstrate unpleasant taste masking ability for various intense sweeteners in chewing gum products containing spearmint oil as the flavoring agent.

| Ingredient (Percent by Weight) | EXAMPLES 9-14 | | | | | |
|---|---|---|---|---|---|---|
| | 9 | 10 | 11 | 12 | 13 | 14 |
| gum base | 23.0 | 23.0 | 23.0 | 23.0 | 23.0 | 23.0 |
| bulking agent | 59.8 | 59.475 | 59.7 | 59.6 | 59.65 | 59.55 |
| softener | 15.5 | 15.5 | 15.5 | 15.5 | 15.5 | 15.5 |
| colorant | 0.2 | 0.2 | 0.2 | 0.2 | 0.2 | 0.2 |
| spearmint | 1.5 | 1.5 | 1.5 | 1.5 | 1.5 | 1.5 |
| Sucralose (ppm) | — | 525 | 1000 | | | |
| Aspartame (ppm) | — | | | 2000 | | |
| Saccharin (ppm) | — | | | | 1500 | |
| Acesulfame-K (ppm) | — | | | | | 2500 |

An expert sensory chew panel evaluated the chewing gum products of examples 9-14. Example 9 illustrates a conventional gum product containing spearmint oil as the flavoring agent (which has a bitter taste or unpleasant offnote) with no non-bitter intense sweetener present. The chewing gum product of example 9 contained a 13.6% increase in spearmint flavor ingredients which resulted in a nearly twofold increase in the bitter/off-note sensation taste of the chewing gum product.

The chewing gum product of examples 13 and 14, which contained Saccharin and Acesulfame-K as the intense sweetening agents, respectively, exhibited little or no reduction of bitterness/or other off-note sensation compared to the chewing gum product of example 9 which contain no intense sweetener. The chewing gum products of examples 10 and 12, which contained small amounts of Sucralose and Aspartame as the intense sweetener, similarly showed little reduction of unpleasant taste compared to the product of example 9. The most significant decrease in the reduction of unpleasant taste/bitterness sensation was observed in the chewing gum product of example 11, which contained twice the amount of Sucralose sweetener as the product of example 10.

The chewing gum product of example 11 was significantly more preferred than the chewing gum products of examples 9-10 and 12-14 because the product of example 11 had a pleasant and prolonged spearmint flavor without any bitter aftertaste or other unpleasant off-note.

The invention being thus described, it will be obvious that the same may be varied in many ways. Such variations are not to be regarded as a departure from the spirit and scope of the invention and all such modifications are intended to be included within the scope of the following claims.

We claim:

1. An unpleasant taste masking composition which comprises a medicament drug having a bitter taste or unpleasant off-note and a chlorodeoxysugar derivative selected from the group consisting of chlorodeoxysucrose derivatives and chlorodeoxygalactosucrose derivaties and mixtures thereof in an amount from about 0.001% to about 5.0%, by weight to nullify the taste or unpleasant off-note of the medicament drug.

2. The composition of claim 1, wherein the chlorodeoxysugar derivative is 4,1',6'-trichloro-4,1',6'-trideoxygalactosucrose.

3. The composition of claim 1, wherein the medicament drug having a bitter taste or unpleasant off-note is selected from the group of medicament drugs consisting of analgesics, antiasmatics, antitussives, antihistamines, antinauseants, decongestants, alkaloids, laxatives, anticholesterolemic and antiliped agents, appetite suppressants, central nervous system stimulants, expectorants, anti-inflammatory agents, nutritional supplements and mixtures thereof.

4. The composition of claim 1, wherein the chlorodeoxysugar derivative is present in an amount from about 0.02% to about 1.0%, by weight of the composition.

5. The composition of claim 4 wherein the chlorodeoxysugar derivative is present in an amount from about 0.05% to about 0.5% by weight of the composition.

6. The composition of claim 1, wherein the medicament drug having a bitter taste or unpleasant off-note is present in an amount from about 0.0001% to about 5.0%, by weight of the composition.

7. A chewing gum composition which comprises a chewing gum base and an effective amount of an unpleasant taste masking composition wherein the unpleasant taste masking composition comprises a medicament drug having a bitter taste or unpleasant off-note and a chlorodeoxysugar derivative selected from the group consisting of chlorodeoxysucrose derivatives and chlorodeoxygalactosucrose derivatives and mixtures thereof in an amount from about 0.001% to about 5.0%, by weight to nullify the taste or unpleasant off-note of the medicament drug.

8. The chewing gum composition of claim 7, wherein the chloroeoxysugar derivative is 4,1', 6', -trichloro-4,1',6'-trideoxygalactosucrose.

9. The chewing gum composition of claim 7, wherein the medicament drug having a bitter taste or unpleasant off-note is selected from the group of medicament drugs consisting of analgesics, antiasmatics, antitussives, antihistamines, antinauseants, decongestants, alkaloids, laxatives, anticholesterolemic and antiliped agents, appetite suppressants, central nervous system stimulants, expectorants, anti-inflammatory agents, nutritional supplements and mixtures thereof.

10. The chewing gum composition of claim 7, wherein the chlorodeoxysugar derivative is present in ana mount from about 0.02% to about 1.0%, by weight of the composition.

11. The chewing gum composition of claim 10, wherein the chlorodeoxysugar derivative is present in an amount from about 0.05% to about 0.5% by weight of the composition.

12. A chewing gum composition which comprises a chewing gum base and an effective amount of an unpleasant taste masking composition wherein the unpleasant taste masking composition comprises a medicament drug 4,1',6'-trichloro-4,1',6'-trideoxygalactosucrose in an amount of from about 0.001% to about 5.0%, by weight to nullify the bitter taste or unpleasant off-note of the medicament drug.

13. A confectionery composition which comprises a confectionery base and an effective amount of an unpleasant taste masking composition wherein the unpleasant taste masking composition comprises a medicament drug having a bitter gtaste or unpleasant off-note and a chlorodeoxysugar derivative selected from the group consisting of chlorodeoxysucrose derivatives and chlorodeoxygalactosucrose derivatives and mixtures thereof in an amount from about 0.001% to about 5.0%, by weight to nullify the taste or unpleasant off-note of the medicament drug.

14. The confectionery composition of claim 3, wherein the chlorodeoxysugar derivative is 4,1',6'-trichloro-4,1',6'-trideoxygalactosucrose.

15. The confectionery composition of claim 13, wherein the medicament drug having a bitter taste or unpleasant off-note is selected from the medicament drugs consisting of analgesics, antiasmatics, antitussives, antihistamines, antinauseants, decongestants, alkaloids, laxatives, anticholesterolemic and antilipid agents, appetite suppressants, central nervous system stimulants, expectorants, anti-inflammatory agents, nutritional supplements and mixtures thereof.

16. The confectionery composition of claim 13, wherein the chlorodeoxysugar derivative is present in an amount from about 0.02% to about 1.0%, by weight of the composition.

17. The confectionery composition of claim 16, wherein the chlorodeoxysugar derivative is present in an amount from about 0.05% to about 0.5%, by weight of the composition.

18. A confectionery composition which comprises a confectionery base and an effective amount of an unpleasant taste masking composition wherein the unpleasant taste masking composition comprises a medicament drug and 4,1',6'-trichloro-4,1',6'-trideoxygalactosucrose in an amount of from about 0.001% to about 5%, by weight to nullify the bitter taste or unpleasant off-note of the medicament drug.

19. A pharmaceutical ingestible composition which comprises a pharmaceutically acceptable carrier and a therapeutically effective amount of an unpleasant taste masking composition wherein the unpleasant taste masking composition comprises a medicament drug having a bitter taste or unpleasant off-note and a chlorodeoxysugar derivative selected from the group consisting of chlorodeoxysucrose derivatives and chlorodeoxygalactosucrose derivatives and mixtures thereof in an amount of from about 0.001% to about 5.0%, by weight to nullify the taste or off-note of the medicament drug.

20. A method for preparing an unplesant taste masking composition comprising a medicament drug having a bitter taste or unpleasant off-note which comprises: admixing the medicament drug having a bitter taste or unpleasant off-note and a chlorodeoxysugar derivative selected from the group consisting of chlorodeoxysucrose derivaties and chlorodeoxygalactosucrose derivatives and mixtures thereof in an amount of from about 0.001% to about 5.0%, by weight to nullify the taste or off-note of the medicament drug.

21. The method of claim 20, wherein the medicinal agent having a bitter taste or unpleasant off-note is present in an amount from about 0.0001% to about 5.0%, by weight of the composition.

22. The method of claim 21, wherein the medicinal agent having a bitter taste or unpleasant off-note is present in an amount from about 1.0% to about 3.0% and the chlorodeoxysugar derivative is present in an amount from about 0.02% to about 1.0%, by weight of the composition.

23. The method of claim 22, wherein the medicinal agent having a bitter taste or unpleasant off-note is present in an amount from about 1.2% to about 2.5% and the chlorodeoxysugar derivative is present in an amount from about 0.05% to about 0.5%, by weight of the composition.

24. The method of claim 22, wherein the chlorodeoxysugar derivative is 4,1',6'-trichloro-4,1',6'-trideoxygalactosucrose.

25. The method of claim 20, wherein the medicament drug having a bitter taste or unpleasant off-note is selected from the group of medicament drugs consisting of analgesics, antiasmatics, antitussives, antihistamines, antinauseants, decongestants, alkaloids, laxatives, anticholesterolemic and antilipid agents, appetite suppressants, central nervous system stimulants, expectorants, anti-inflammatory agents, nutritional supplements and mixtures thereof.

26. A method for sweetening ingestible compositions which comprises adding to the ingestible composition an effective amount of an unpleasant taste masking composition wherein the unpleasant taste masking composition comprises a medicament drug having a bitter taste or unpleasant off-note and a chlorodeoxysugar derivative selected from the group consisting of chlorodeoxysucrose derivatives and chlorodeoxygalactosucrose derivatives and mixtures thereof in an amount of from about 0.001% to about 5.0%, by weight to nullify the bitter taste or off-note of the medicament drug.

27. The method of claim 26, wherein the medicament drug having a bitter taste or unpleasant off-note is present in an amount from about 0.0001% to about 5.0% by weight of the composition.

28. The method of claim 27, wherein the medicament drug having a bitter taste or unpleasant off-note is present in an amount from about 1.0% to about 3.0% and the chlorodeoxysugar derivative is present in an amount from about 0.02% to about 1.0%, by weight of the composition.

29. The method of claim 28, wherein the medicament drug having a bitter aftertaste or unpleasant off-note is present in an amount from about 1.2% to about 2.5% and the chlorodeoxysugar derivative is present in an amount from about 0.05% to about 0.5%, by weight of the composition.

30. The method of claim 26, wherein the chlorodeoxysugar derivative is 4,1',6'-trichloro-4,1',6'-trideoxygalactosucrose.

31. The method of claim 26, wherein the medicament drug having a bitter taste or unpleasant off-note is selected from the group of medicament drugs consisting of analgesics antiasmatics, antitussives, antihistamines, antinauseants, decongestants, alkaloids, laxatives, anticholesterolemic and antilipid agents, appetite suppressants, central nervous system stimulants, expectorants, anti-inflammatory agents, nutritional supplements and mixtures thereof.

* * * * *